United States Patent [19]
Higo et al.

[11] Patent Number: 5,791,566
[45] Date of Patent: Aug. 11, 1998

[54] METHOD AND APPARATUS FOR SUBMERGED GRINDING OF WASTES

[75] Inventors: Tsutomu Higo, Kanagawa-ken; Kazuhiro Kondo, Tokyo; Roberto Masahiro Serikawa, Kanagawa-ken, all of Japan

[73] Assignee: Ebara Corporation, Tokyo, Japan

[21] Appl. No.: 812,130

[22] Filed: Mar. 5, 1997

[30] Foreign Application Priority Data

Mar. 5, 1996 [JP] Japan .................................... 8-073045

[51] Int. Cl.$^6$ .......................... B02C 19/12; B02C 23/18
[52] U.S. Cl. .................... 241/20; 241/21; 241/46.17; 241/79.1
[58] Field of Search ................... 241/20, 21, 46.17, 241/79.1, DIG. 38, 15

[56] References Cited

U.S. PATENT DOCUMENTS

| | | | |
|---|---|---|---|
| 4,284,514 | 8/1981 | Wright | 241/DIG. 38 X |
| 4,624,417 | 11/1986 | Gangi | 241/17 |
| 5,104,047 | 4/1992 | Simmons . | |
| 5,297,742 | 3/1994 | Grunditz et al. | 241/20 |
| 5,303,871 | 4/1994 | Bateson et al. | 241/20 |
| 5,377,917 | 1/1995 | Wiljan et al. | 241/14 |
| 5,409,605 | 4/1995 | Haley et al. . | |
| 5,536,373 | 7/1996 | Carlson et al. | 162/261 |

FOREIGN PATENT DOCUMENTS

| | | |
|---|---|---|
| 95/14850 | 6/1995 | WIPO . |
| 96/41070 | 12/1996 | WIPO . |

OTHER PUBLICATIONS

Klosky, M., "Chlorine, Sulfur, and Soluble Slag Extraction with Energy Density Improvements of a MSW Slurry", Coal Util. Full Syst. The greening Coal, pp. 205–213, 1994.

Serikawa, M.R.; Funazukuri, T.; Wakao, N., "Oil Conversion of Vinasse with High–Density Water" Fuel, vol. 71, Mar., pp. 283–287.

Primary Examiner—John M. Husar
Attorney, Agent, or Firm—Wenderoth, Lind & Ponack, L.L.P.

[57] ABSTRACT

An improved apparatus for submerged grinding of wastes includes a vessel that is filled with an alkaline liquid and which has a mechanism for grinding a feed waste containing organic solids, a feeding mechanism for charging the feed waste into the vessel, a primary screening mechanism for filtering the liquid being discharged from the grinding mechanism and a secondary screening mechanism by which the waste/liquid mixture that has been filtered by the primary classification mechanism is freed of the liquid fraction such that the waste is converted into a slurry. The apparatus further includes a line by which the filtrate from the secondary classification mechanism is returned to the liquid with which the vessel is filled, a mechanism for adding an alkaline aqueous solution and/or particulate matter into the liquid with which the vessel is filled, a mechanism for detecting the pH of the liquid with which the vessel is filled, and a mechanism for adjusting the amount of addition of the alkaline aqueous solution and/or particulate matter into the liquid with the vessel is filled on the basis of the value detected by the pH detecting mechanism in order to ensure that the liquid with which the vessel is filled is maintained in an alkaline condition. Using this apparatus, submerged grinding of wastes can be accomplished over an extended period with the progress of putrefaction being retarded and the emission of malodor being suppressed with the resulting advantage of facilitated liquid maintenance.

28 Claims, 1 Drawing Sheet

5,791,566

1

METHOD AND APPARATUS FOR SUBMERGED GRINDING OF WASTES

BACKGROUND OF THE INVENTION

This invention relates to a method for submerged grinding or shredding of wastes. More particularly, the invention relates to a method and an apparatus for submerged grinding or shredding of wastes by which solids-containing carbonaceous wastes such as municipal, industrial and agricultural wastes are converted into a slurry for use as a fuel mixture or the like in a hydrothermal reaction treatment.

In the conventional submerged grinding of wastes, the pH of the liquid in the system is usually left unadjusted, except when the surface tension of the liquid is adjusted during wastewater treatment or when the pH is adjusted to near neutral or about 8 for the purpose of accelerating settlement or drainage.

In the subsequent process of forming a fuel mixture by applying a hydrothermal reaction treatment to the slurry prepared by submerged grinding of wastes, an alkali is added at the early stage and the slurry is rendered alkaline in order to prevent the decrease in pH due to the dechlorination of certain wastes or in order to increase the yield of oil or fat content.

The aforementioned method for submerged grinding of wastes has various problems if the wastes are solely composed of non-putrescibles such as waste baling materials and paper. There is not a problem at all, however, if the wastes received contain garbage, agricultural wastes and organic sludge. However, the liquid used in the grinding operation will eventually start to putrefy and give off malodor to either deteriorate the working environment or become a cause of complaint from the residents in nearby areas. In addition, the products of putrefaction have an increased viscosity and this presents not only the need to provide a greater tolerance in the design of the working mechanism of the submerged grinder and the electrical power system for the fluid transfer pump but also the need to incorporate special features in the piping system. What is more, blown liquid extracted from within the submerged grinder either during or after the operation has extremely high BOD and COD levels due to the putrefaction products and requires substantial amounts of waste water treatment. On account of the organic acids and nitrous acid that occur in the putrefaction process, the pH of the liquid within the submerged grinder drops to about 5 and can potentially cause metal corrosion. Furthermore, the conventional method of submerged grinding of wastes involves many problems with sanitation and hence is by no means unobjectionable to the operating personal and the residents in nearby areas.

Speaking of municipal wastes and garbage, they already start spoiling while they are being stored after collection from individual houses and their pH typically drops to about 5 on account of the organic acids and nitrous acid which are products of putrefaction. Hence, the pH of the liquid used in grinding is not effectively increased by adding a fairly large amount of alkali solution. At a reduced pH, the calcium carbonate and phosphate in the seashells, eggshells and bones in the wastes will dissolve out and this can be a cause of calcium scale deposits that are formed on heat transfer surfaces and inner surfaces of equipment during heat exchange and reaction in treatment processes such as the hydrothermal reaction of the waste slurries. This makes it difficult to ensure prolonged continuous operation of the treatment processes and their operation must be shut down occasionally to remove the scale deposit by dissolving it

2 with chemicals or cleaning on diassembled parts. However, this has imposed considerable burden on the operating personnel.

SUMMARY OF THE INVENTION

The present invention has been accomplished under these circumstances and has an object providing an economical method for submerged grinding of wastes that retards putrefaction, that suppresses malodor, that facilitates liquid management and that permits a prolonged continuous operation.

Another object of the invention is to provide an apparatus for implementing the method.

The first object of the invention can be attained by a method for submerged grinding of wastes by which a feed waste containing organic solids is ground and shredded while being suspended in a liquid, followed by removal of the liquid fraction from the waste/liquid mixture so as to convert the waste into a slurry, characterized in that the pH of the liquid in which the feed waste is suspended is maintained in an alkaline condition and that the liquid fraction which has been removed for conversion into a slurry is returned to the liquid in which the feed waste is suspended.

The second object of the invention can be attained by an apparatus for submerged grinding of wastes which includes a vessel that is filled with an alkaline liquid and which has a mechanism for grinding a feed waste containing organic solids, a feeding mechanism for charging the feed waste into the vessel, a primary screening mechanism for filtering the liquid being discharged from the grinding mechanism and a secondary screening mechanism by which that waste/liquid mixture that has been filtered by the primary classification mechanism is freed of the liquid fraction such that the waste is converted into a slurry. The apparatus further includes a line by which the filtrate from the secondary classification mechanism is returned to the liquid with which the vessel is filled, a mechanism for adding an alkaline aqueous solution and/or particulate matter into the liquid with which the vessel is filled, a mechanism for detecting the pH of the liquid with which the vessel is filled, and a mechanism for adjusting the amount of addition of the alkaline aqueous solution and/or particulate matter into the liquid with which the vessel is filled on the basis of the value detected by the pH detecting mechanism in order to insure that the liquid with which the vessel is filled is maintained in an alkaline condition.

DETAILED DESCRIPTION OF THE INVENTION

Figure 1:
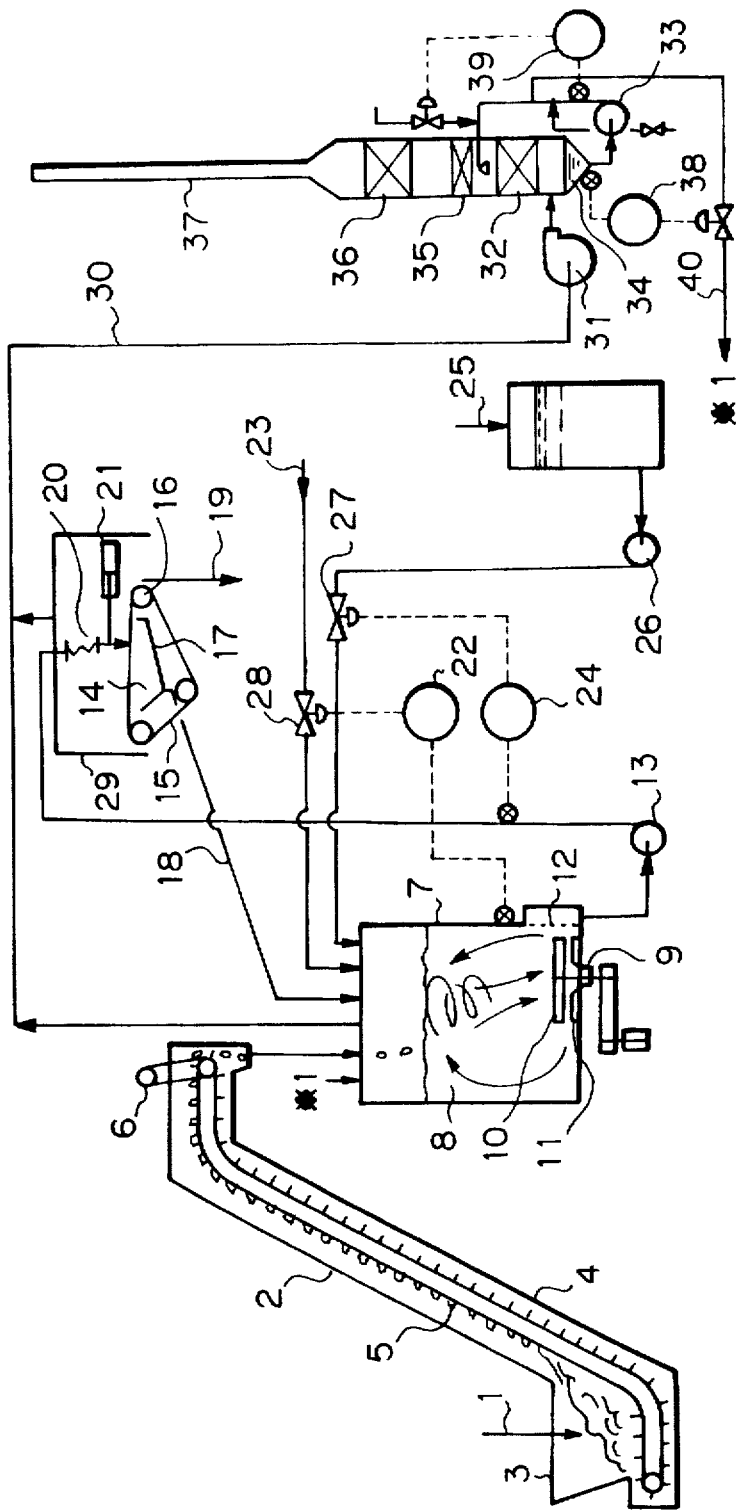
FIG. 1 shows the general layout of a processing system for wastes using the submerged grinding apparatus of the invention.

In order to ensure that there will be no extreme variations in the wastes concentration of the liquid in the vessel having a grinding mechanism, the feed waste containing organic solids is charged through a feeding mechanism either continuously in small portions or in a somewhat quantitative manner such that they are added in an amount of 1–3% of the weight of the liquid. The vessel having a grinding mechanism preferably employs a "pulper" which is commonly adopted in the papermaking process for converting waste paper and wood chips into a slurry.

The grinding mechanism is composed of two kinds of teeth, one being fixed and the other being capable of rotation. The liquid in the vessel is circulated in such a way that the entire part of it is vigorously agitated by an intense stream that is created by the rotary teeth and which is forced out intensely to flow back to the rotary teeth. As a result, the charged feed wastes are attracted toward the grinding mechanism together with the liquid stream and are subjected to repeated shearing and grinding actions between the fixed and rotary teeth until they are ground to fine fragments.

In the meantime, the organic acids and nitrous acid in the waste also dissolve out to be neutralized by the alkali content of the liquid. Therefore, it is necessary to compensate for the consumed alkali by adding an alkali in the form of either an aqueous solution or a particulate matter. To this end, the pH of the liquid as either contained in or taken out of the vessel having the grinding mechanism is detected and an alkali is added in an amount that is controlled such as to maintain a pH of at least 9, desirably 10 or more, either by adjusting the opening of a valve such as a flow control valve or the on-off intervals of injection (if the alkali is in aqueous solution) or by adjusting the rotating speed of a feeder or the on-off intervals of the feeding operation (if the alkali is a particulate matter). The alkali may be added either directly into the liquid in the vessel having the grinding mechanism or it may be added indirectly, i.e., into the liquid flowing into the vessel or into the feed waste being charged into the vessel.

If the waste slurry is to be given heat as in a hydrothermal reaction or concentrated to reduce the liquid content, the alkali is preferably selected from among aqueous solutions of alkali metal hydroxides such as sodium hydroxide and potassium hydroxide and it is not preferred to use hydroxides of alkaline earth metals such as calcium and magnesium. Compounds of alkaline earth metals tend to form scale deposits of carbonates, sulfates, hydroxyl compounds, hydrates, hydrogen carbonates, etc. on heat transfer surfaces, inner surfaces of pipes, the inside surface of a reactor, etc. in those areas where pH rises are prevalent such as in the neighborhood of the injection point and the hydrothermal reaction site, or where frequent heat transfer occurs, or where sulfur oxides or carbon dioxide will form. If the pH does not rise but simply drops or if there are no changes in pH, scale will be deposited only with difficulty and there is not much reason to avoid alkaline earth metals.

If the liquid is rendered alkaline simultaneously with the start of submerged grinding of the feed waste, calcium compounds such as calcium carbonate and calcium phosphate that are present in the waste have such low solubility under the alkaline condition that they will hardly dissolve out in the liquid and the above-described scale deposit is very slight. If there is no possibility for the pH to increase, no scale deposit occurs and therefore calcium hydroxide and magnesium hydroxide which are inexpensive and which permit ease in pH adjustment may be used.

Almost all putrefactive bacteria are inactive under alkaline (pH≥9) environments and they will be dead at a pH of 10 or more, and the progress of putrefaction is retarded.

If the feed waste is charged into the liquid, ammonium ions that are formed by the decomposition of proteins and urea in the waste are partly displaced by the alkali, whereupon ammonia gas will evolve from the liquid to cause a malodor. To deal with this problem, the air aspirated from within the vessel or any other locations where the liquid is present is desirably washed with an acid before it is passed through an activated carbon bed to absorb or adsorb the malodorous components. Washing with an alkali is not necessary since no acidic gaseous components will evolve in the alkaline liquid.

The vessel is furnished with a primary classification mechanism in an area that has vigorous contact with the liquid stream created by the rotary teeth. The primary classification mechanism is typically in the form of a screen plate such as a bar screen or a punched plate that have openings of a size of about 10 mm which substantially corresponds a maximum size of the particles that may be contained within the waste slurry. The feed waste that has been ground while suspended in the liquid is filtered through the screen plate and taken out of the vessel having the grinding mechanism. An oversized fraction of the waste which cannot pass through the screen plate is retained within the vessel and continually subjected to the action of the grinding mechanism. It should be noted that the liquid stream created by the rotary teeth will impinge against the screen surface and push aside the oversized fraction of the waste, thereby preventing plugging of the screen openings.

Thus, in order to secure efficient grinding of the waste while ensuring that the yet to be ground portion of the waste which is retained on the screen plate forming the primary classification mechanism can be effectively displaced, it is desired that the waste freely move about in the vessel and, hence, the liquid preferably has the lowest possible viscosity. In contrast, in the process of storing and processing the waste slurry, the latter must retain fluidity and yet the lowest water content must be assured in order to prevent the solids from settling out, to realize a compact apparatus and to reduce heat loss and effluent formation. To meet these requirements a secondary classification mechanism for filtering off water is provided. This may be in the form of a belt filter made of a filter cloth of a screw press employing a punched plate or bar screen which have openings of a size not greater than about 6 mm. In order to retain fluidity, excessive dewatering is not preferred but adjustability to a suitable water content is preferred. The water content need be adjusted in view of viscosity and fluidity either by first performing excessive filtration and then returning the filtrate into the dewatered slurry or by adjusting the filtration time. The filtrate has to be returned to the vessel having the grinding mechanism for reducing not only the required amount of alkali addition but also the load of waste water treatment. Normally, the waste slurry has a higher water content than the feed waste to be subjected to submerged grinding and, therefore, the liquid circulating between the vessel having the grinding mechanism and the secondary classification mechanism need be compensated for the water that has been carried over by the waste slurry.

The present invention will now be described more specifically with reference to FIG. 1, which shows the general layout of a system for processing wastes with the submerged grinding apparatus of the invention. A feed waste 1 containing organic solids is dry crushed with a biaxial shearing crusher, an impact crusher or the like into pieces of a size of about several tens of millimeters which are small enough to be smoothly handled by a submerged grinding mechanism but which will not easily form a band that wraps around the teeth in the grinding mechanism. The crushed waste is dumped at a time into a hopper 3 which is a slightly inclined or into a horizontal bottom part of a charging conveyor 2 such that it is temporarily stored on a conveyor belt 4. Since the conveyor belt 4 is moving, the feed waste is transported as it is carried in small portions on receiving plates 5 until they reach the conveyor head, from which they are charged into a grinding vessel 7 filled with a liquid 8. The charging conveyor 2 is driven by a motor 6 that is fitted with a variable speed gear so as to adjust the throughput in accordance with the type of the waste to be processed and, in addition, the conveyor 2 is adapted to be capable of running in either a forward or reverse direction for coping with operational troubles. In the illustrated case, the charging conveyor 2 is belt conveyor 4 that slopes upwardly at a very steep angle of 60–75 degrees and which is furnished with receiving plates that are provided at a pitch of about 300–800 mm and have a height of about 100–300 mm.

Since the charging conveyor 2 slopes upwardly at the stated very steep angle, that portion of the crushed waste which does not just fit on the respective receiving plates 5 will tumble down the plates since a sufficient space for the crushed waste to fall down is provided above the conveyor belt 4 and, as a result, the distribution of the crushed waste becomes uniform and it is carried in substantially equal amounts on the respective plates 5. In order to provide greater uniformity in the distribution of crushed waste 1, it is preferably homogenized by a suitable method such as mixing or ground into smaller sizes. The crushed waste 1 that has tumbled down the receiving plates 5 in the steep portion of the conveyor is stockpiled on the conveyor in the area of transition from the flat to the steep portion and, as the conveyor belt 4 ascends, the bottom of the pile is picked up by the scraping action of the belt whereas the top of the pile crumbles. These actions are repeated such that the crushed waste retained on the conveyor belt is rotated as a whole and, at the same time, it is transported quantitaively by the receiving plates 5.

Hence, the retained mass of crushed waste is constantly stirred up and continuously agitated to be prevented from becoming consolidated into a compacted form. In addition, the retained mass on the conveyor is sufficiently mixed and homogenized to reduce variations in bulk density. This contributes to a further decrease in variations of the amount of crushed waste that is transported by the conveyor belt. Therefore, greater uniformity can be achieved in the quantity and quality of the feed waste by securing a greater capacity in the retaining region of the conveyor (i.e., the area of transition from the flat to the steep portion) so as to permit increased retention of the crushed waste.

The grinding vessel 7 is equipped with a grinder 9 that consists of rotary teeth 10 and fixed teeth 11. The centrifugal force of the rotating teeth 10 creates a liquid stream that leaves the rotary teeth and which addtionally creates a stream flowing back to the rotary teeth 10. The two streams intermix well enough to ensure that the feed waste 1 charged into the vessel 7 will flow into the rotating teeth 10 to be ground into finer fragments under the shearing, impact, grinding and other actions that are caused by the combination of the fixed teeth 11 and the rotary teeth 10. The grinding of the waste occurs each time the circulating stream of the liquid 8 passes through the gap between the fixed teeth 11 and the rotary teeth 10. The height of the fixed teeth 11 is variable such that the clearance between the fixed teeth 11 and the rotary teeth 10 can be adjusted in accordance with the required degree of grinding in terms of fragment size and the properties of the waste 1 to be ground.

A primary classification mechanism in the form of a punched plate 12 having an opening size of about 10 mm provided on a sidewall of the grinding vessel 7 in an area against which the liquid coming out of the rotary teeth 10 is forced to impinge. The liquid 8 in the vessel 7 is withdrawn through the punched plate 12 by means of a pump 13 and delivered to a secondary classification mechanism in the form of a belt filter 14. An oversized fraction of the waste 1 that is retained on the punched plate 12 is pushed back into the vessel 7 by the liquid stream flowing out of the rotary teeth 10 and subjected to continued grinding by the combination of the fixed teeth 11 and rotary teeth 10 until it becomes small enough to pass through the openings in a punching plate 12.

The belt filter 14 is a conveyor belt 15 that is made of a filter cloth and which is provided in a head portion thereof with a scraper 16 that forcibly detaches the filtration residue from the filter cloth such that it is discharged as a waste slurry 19. The filtrate through the filter cloth 15 collects on a receiving tray 17 and flows downwardly through a pipe 18 to return into the grinding vessel 7. In order to ensure that the concentration of the waste slurry 19 can be adjusted, a flexible hose 20 is provided such that the liquid can be supplied onto the filtration belt 15 in variable positions by adjustment by a positioner-fitted air cylinder 21. By adjusting the position in which the liquid is supplied from the head portion of the belt filter 14, the filtration time is varied such as to adjust the water content of the waste slurry 19.

Since the waste slurry 19 has a much higher water content than the feed waste 1, the amount of the liquid circulating in the grinding vessel 7 will decrease with time. Therefore, a level gage 22 is fitted on the grinding vessel 7, and makeup water 23 is added by its amount being adjusted with a flow regulating valve 28 in order to ensure that the liquid level of the grinding vessel 7 remains constant.

The pH of the liquid withdrawn from the vessel 7 by means of the pump 13 is measured by a pH meter 24 and a solution of sodium hydroxide 25 is injected into the vessel 7 by means of a dispensing pump 26 with its amount being adjusted by means of a flow regulating pipe 27 such that the pH of the liquid will be 10. By maintaining this pH value, the bacteria that are carried by the feed waste into the grinding vessel 7 can be killed such as to provide a sanitary condition while retarding the progress of putrefaction in the circulating flow of the liquid 8 within the vessel 7.

The liquid flowing in the grinding vessel 7 and other parts of the system is alkaline and, hence, will give off odorous components which are typically the ammonia contained in the feed waste. To solve this problem, the air in contact with the liquid is aspirated such that there will be no leakage of odor. Air 30 aspirated from the grinding vessel 7 and a hood 29 of the dewatering unit is ejected out of a blower 31 to be supplied into an absorbent bed 32, where it is rinsed with a cleaning fluid 34 being circulated by means of a pump 33 and freed of ammonia and other odorous components. Thereafter, the air is passed through a mist separator 35 in order to remove the entrained mist, then passed through an activated charcoal bed 36 where any malodorous components are removed by adsorption and, the thus treated air is thereafter discharged into the atmosphere from a stack 37.

It should be noted that the circulating cleaning solution is constantly replenished with a small amount of makeup water in order to ensure that neither salts nor stain will be concentrated and that the cleaning solution will not be exhausted. In proportion with this supply of makeup water, surplus water 40 is discharged into the grinding vessel 7 from the discharge end of the pump 33 with a level regulator 38 being utilized to ensure that the level of the holdup water below the absorbent bed 32 will be kept constant. In addition, in order to ensure that the cleaning solution is always kept acidic, the pH of the water being discharged by the pump 33 is detected by a pH regulator 39 and hydrochloric acid is added to the circulating water with its amount being adjusted to provide a weakly acidic condition (pH= 5–6). The liquid flowing in the grinding vessel 7 and other parts of the system is always controlled to be in the basic condition by means of the pH regulator 24, so that the aspirated air is alkaline and no alkali need be added to the circulating cleaning solution. In addition, as will be understood from the above description, the product of absorption that occurs in the circulating cleaning solution is sodium chloride and it is easy to maintain the circulating cleaning solution in a weakly acidic condition by the buffering action of sodium chloride.

While the present invention has been descried above with reference to a particular embodiment, it should be understood that this is not the sole manifestation of the invention and various improvements and modifications can be made without departing from the scope and spirit of the invention.

As described on the foregoing, the invention ensures that putrefaction of the liquid used in the submerged grinding apparatus can be retarded by killing putrefactive bacteria. Therefore, not only can the emission of malodor be reduced but the overall operation of wastes treatment can also be performed in a sanitary condition, thereby making it less objectionable to the operating personnel and the residents in nearby areas. In addition, there will be no increase in the viscosity of the liquid which would otherwise occur due to the progress of putrefaction, nor will there be BOD and COD in the blown water and these facilitate the maintenance of the liquid in the submerged grinding apparatus. The corrosion of metals in the parts in contact with the liquid can also be suppressed by the improved pH condition.

Further in addition, there is no need for pH adjustment and only a smaller amount of alkali need be added in the processing of the resulting waste slurry and yet the growth of scale deposit on heat transfer surfaces and the inner surfaces of various equipment can be markedly suppressed.

Thus, the present invention provides a very effective solution to the various problems encountered when wastes containing organic solids are converted into a slurry.

What is claimed is:

1. A method for producing an aqueous slurry suitable to be used in a hydrothermal reaction process, said method comprising:
   maintaining a pH of a suspension including an aqueous liquid having organic solids suspended therein in an alkaline condition;
   separating the thus alkaline said aqueous liquid from the thus alkaline said suspension, and thereby producing an alkaline aqueous slurry containing organic solids; and
   recycling the thus separated alkaline aqueous liquid by adding said aqueous liquid to said suspension.

2. A method as claimed in claim 1, comprising maintaining said pH of said suspension at not less than 9.

3. A method as claimed in claim 1, comprising maintaining said pH of said suspension at not less than 10.

4. A method as claimed in claim 1, wherein said maintaining comprises adding alkaline matter to said suspension.

5. A method as claimed in claim 4, wherein said alkaline matter comprises at least one of an alkaline solution and an alkaline particulate.

6. A method as claimed in claim 4, wherein said alkaline matter comprises alkali metal hydroxide.

7. A method as claimed in claim 6, wherein said alkali metal hydroxide comprises at least one of sodium hydroxide and potassium hydroxide.

8. A method as claimed in claim 4, wherein said alkaline matter comprises an alkali earth metal compound.

9. A method as claimed in claim 1, further comprising forming said suspension by adding a feed waste containing said organic solids to said aqueous liquid, and grinding said feed waste suspended in said aqueous liquid.

10. A method as claimed in claim 9, comprising conducting said grinding in a grinding vessel.

11. A method as claimed in claim 10, wherein said grinding vessel has therein a grinder including fixed teeth and rotary teeth.

12. A method as claimed in claim 10 comprising maintaining said pH of said suspension at not less than 9.

13. A method as claimed in claim 10, comprising maintaining said pH of said suspension at not less than 10.

14. A method as claimed in claim 1, further comprising removing volatile gas evolved from said suspension.

15. A method as claimed in claim 14, wherein said removing comprises passing said volatile gas through activated charcoal.

16. A method as claimed in claim 19, wherein said removing comprises treating said volatile gas with an acidic solution.

17. An apparatus for producing an aqueous slurry suitable to be used in a hydrothermal reaction process, said apparatus comprising:
   a vessel adapted to contain a suspension including an aqueous liquid having organic solids suspended therein;
   a sensor for detecting a pH of suspension in said vessel;
   a dispenser for adding alkaline matter into said vessel;
   a controller for adjusting an amount of alkaline matter to be added from said dispenser into said vessel as a function of the pH detected by said sensor, thus to maintain the suspension as an alkaline suspension;
   a screening mechanism for filtrating the alkaline suspension to thereby produce a filtrate and an aqueous slurry; and
   a passage for returning the filtrate into said vessel.

18. An apparatus as claimed in claim 17, wherein said vessel includes a grinding mechanism for grinding the organic solids in the suspension.

19. An apparatus as claimed in claim 18, wherein said grinding mechanism includes fixed teeth and rotary teeth.

20. An apparatus as claimed in claim 17, further comprising a feeder for adding solid waste to said vessel.

21. An apparatus as claimed in claim 17, wherein said screening mechanism comprises a primary screen allowing passage therethrough of relatively larger particles and a secondary screen allowing passage therethrough of relatively smaller particles.

22. An apparatus as claimed in claim 21, wherein said primary screen comprises a screen plate.

23. An apparatus as claimed in claim 21, wherein said primary screen is disposed in said vessel.

24. An apparatus as claimed in claim 21, wherein said secondary screen comprises a belt filter.

25. An apparatus as claimed in claim 17, wherein said dispenser comprises a container and a feed pipe connecting said container and said vessel.

26. An apparatus as claimed in claim 17, further comprising a device for removing a volatile gas evolved from the suspension.

27. An apparatus as claimed in claim 26, wherein said device includes means for passing the volatile gas through activated charcoal.

28. An apparatus as claimed in claim 26, wherein said device includes means for treating the volatile gas with an acidic solution.

* * * * *